United States Patent [19]

Hartman

[11] Patent Number: 4,719,068

[45] Date of Patent: Jan. 12, 1988

[54] METHOD FOR THE PRODUCTION OF PEDESTAL STRUCTURES

[75] Inventor: Daniel A. Hartman, Sunnman, Ind.

[73] Assignee: Hill-Rom Company, Inc., Batesville, Ind.

[21] Appl. No.: 876,102

[22] Filed: Jun. 19, 1986

[51] Int. Cl.$^4$ .............................................. B29C 45/14
[52] U.S. Cl. ..................... 264/263; 264/278; 264/297.2; 264/328.9; 425/116
[58] Field of Search ............ 264/250, 263, 278, 297.2, 264/46.7, 328.9; 425/116

[56] References Cited

U.S. PATENT DOCUMENTS

| | | | |
|---|---|---|---|
| 2,604,661 | 7/1952 | Karns | 425/116 |
| 2,664,497 | 12/1953 | Reynolds | 264/250 |
| 2,838,100 | 6/1958 | Follows | 264/46.7 |
| 3,013,308 | 12/1961 | Armour | 264/297.2 |
| 3,387,075 | 6/1968 | Wilcox | 264/263 |
| 3,458,619 | 7/1969 | Prochaska . | |
| 3,810,620 | 5/1974 | Decker, III et al. | 264/46.7 |
| 4,271,238 | 6/1981 | Braithwaite | 264/46.7 |
| 4,336,920 | 6/1982 | Murray . | |
| 4,372,524 | 2/1983 | Pailler | 264/259 |
| 4,381,908 | 5/1983 | Roth | 264/46.7 |
| 4,405,083 | 9/1983 | Charlebois et al. . | |
| 4,410,561 | 10/1983 | Hart, Jr. . | |

FOREIGN PATENT DOCUMENTS 2512892  3/1983  France .................. 425/116

*Primary Examiner*—James Lowe

[57] ABSTRACT

A method is provided for the production of a pedestal assembly which includes a molded collar portion comprising the steps of providing a pedestal assembly having multiple elongated component members joined together at a joint and oriented at an angle to one another, one of said multiple component members comprising a vertically oriented first component supporting member and another of said multiple component members comprising at least one horizontally oriented second component base member, said pedestal assembly further including a precast collar having an aperture in an upper extent thereof through which said vertically oriented first component supporting member extends, the inner dimension and shape of said collar aperture being substantially identical to the outer dimension and cross-sectional configuration of the portion of said first component member extending through and positioned adjacent said precast collar, and a lower extent of said collar being positioned in encompassing relationship to the junction between said vertically oriented first component member and said at least one horizontally oriented second component member and providing a coating around the second component member and the encompassing collar portion by injection molding.

10 Claims, 12 Drawing Figures

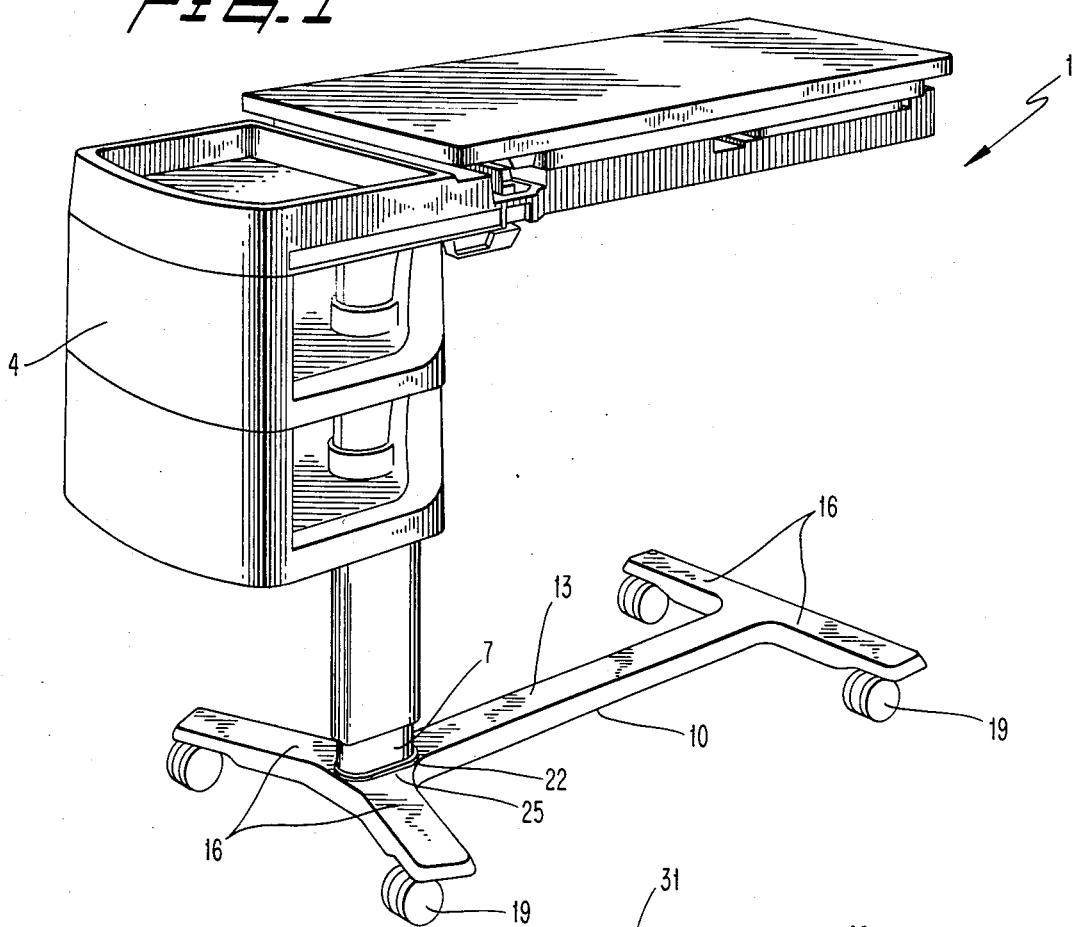
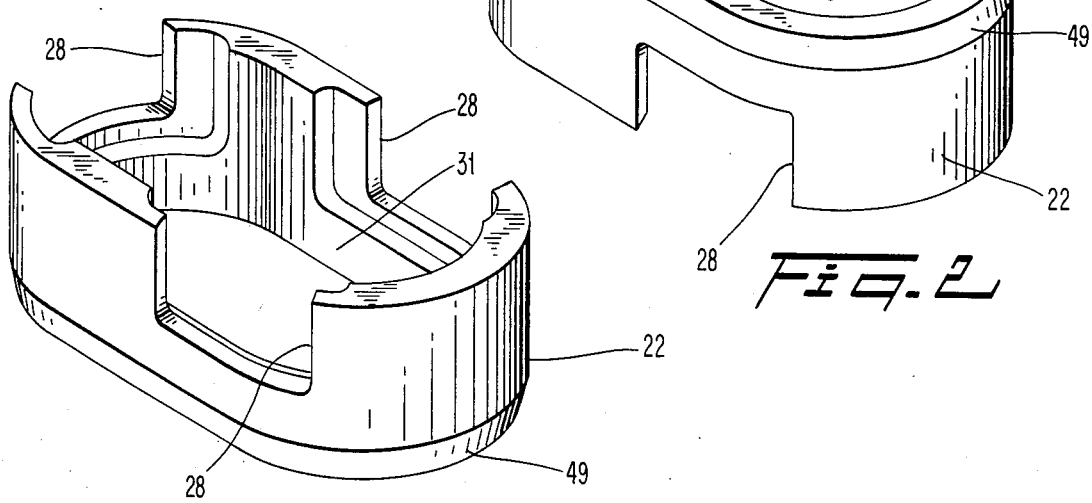

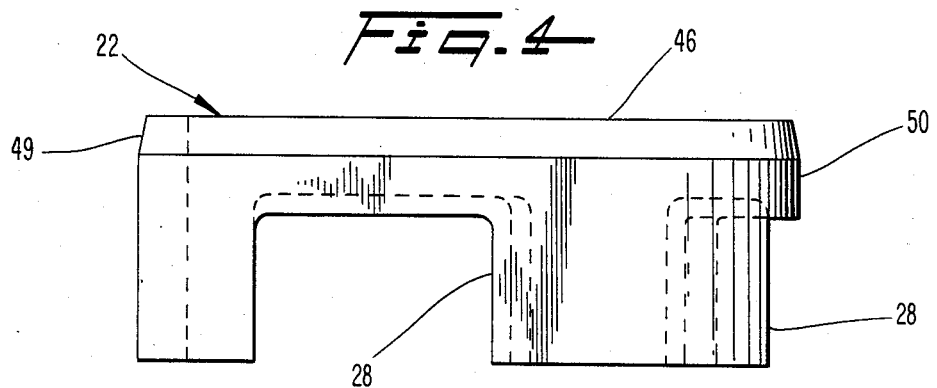
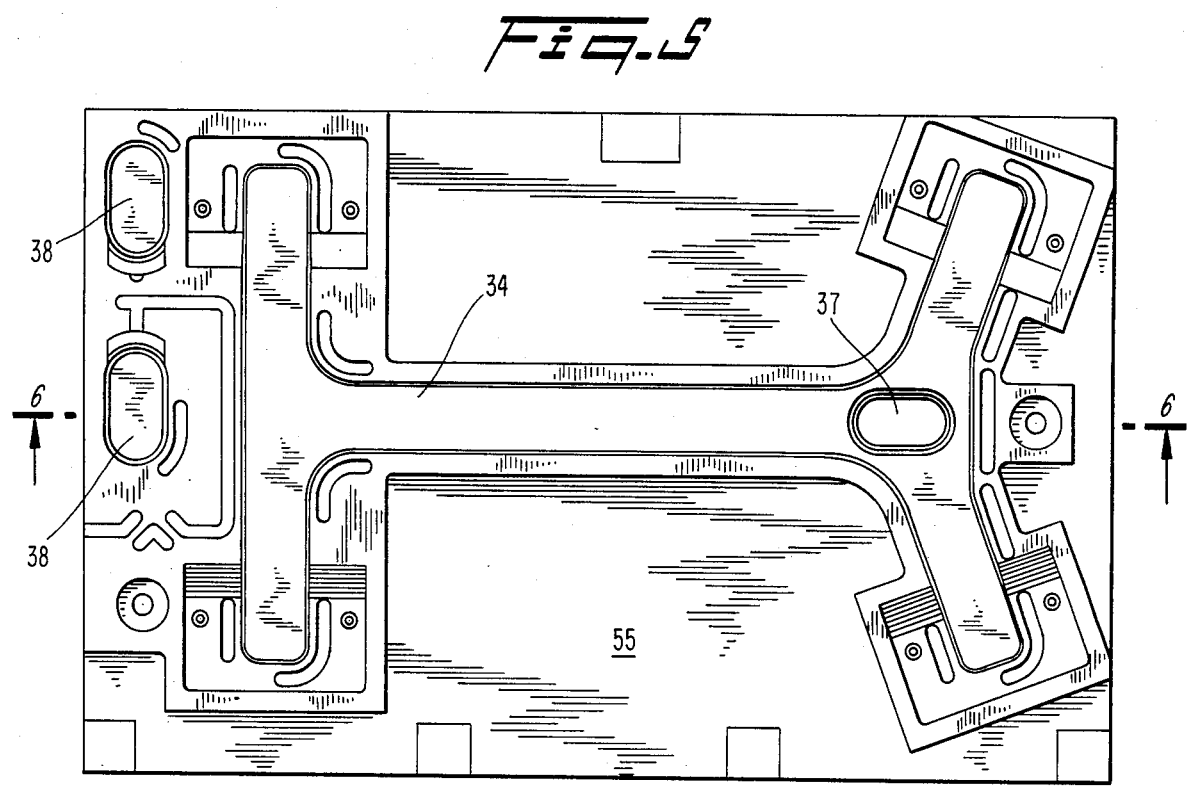
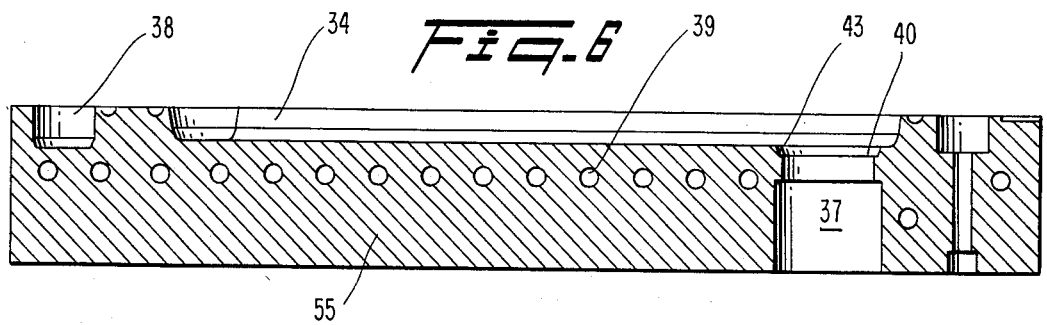

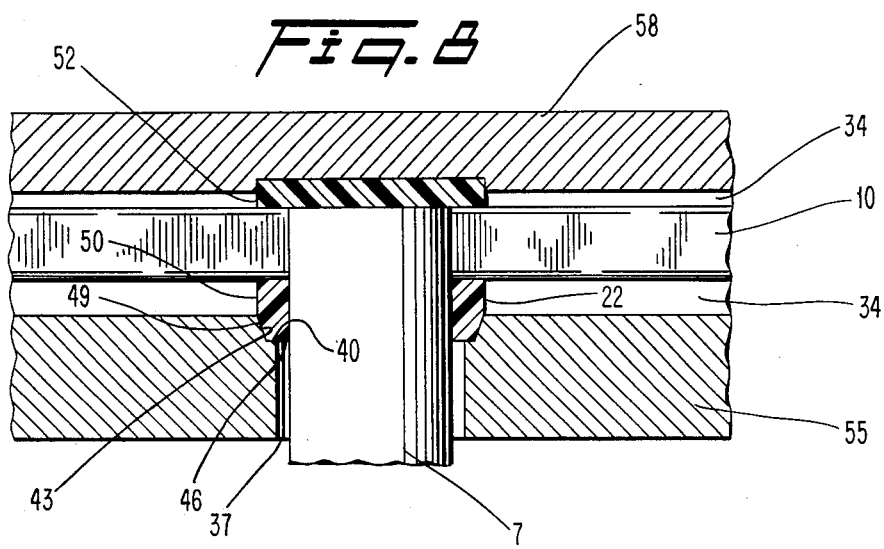
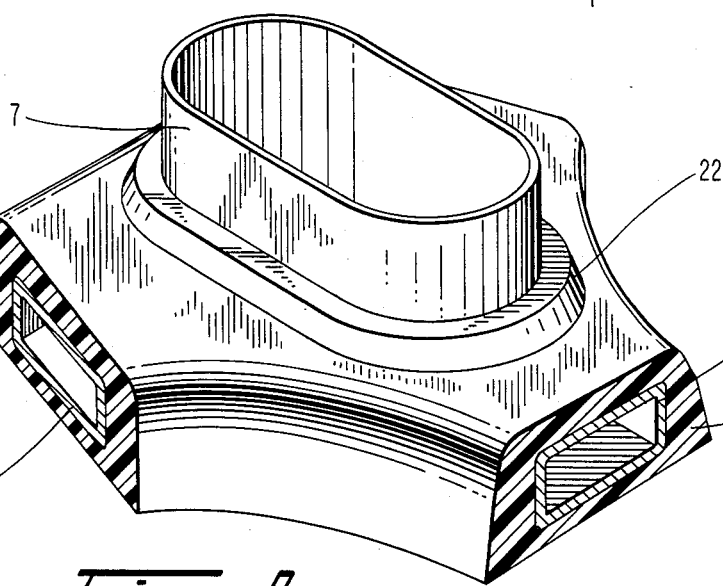
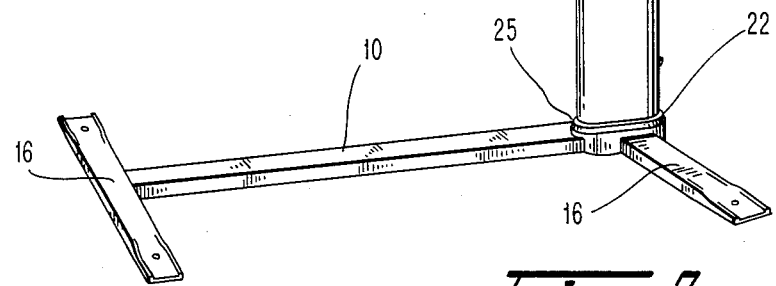

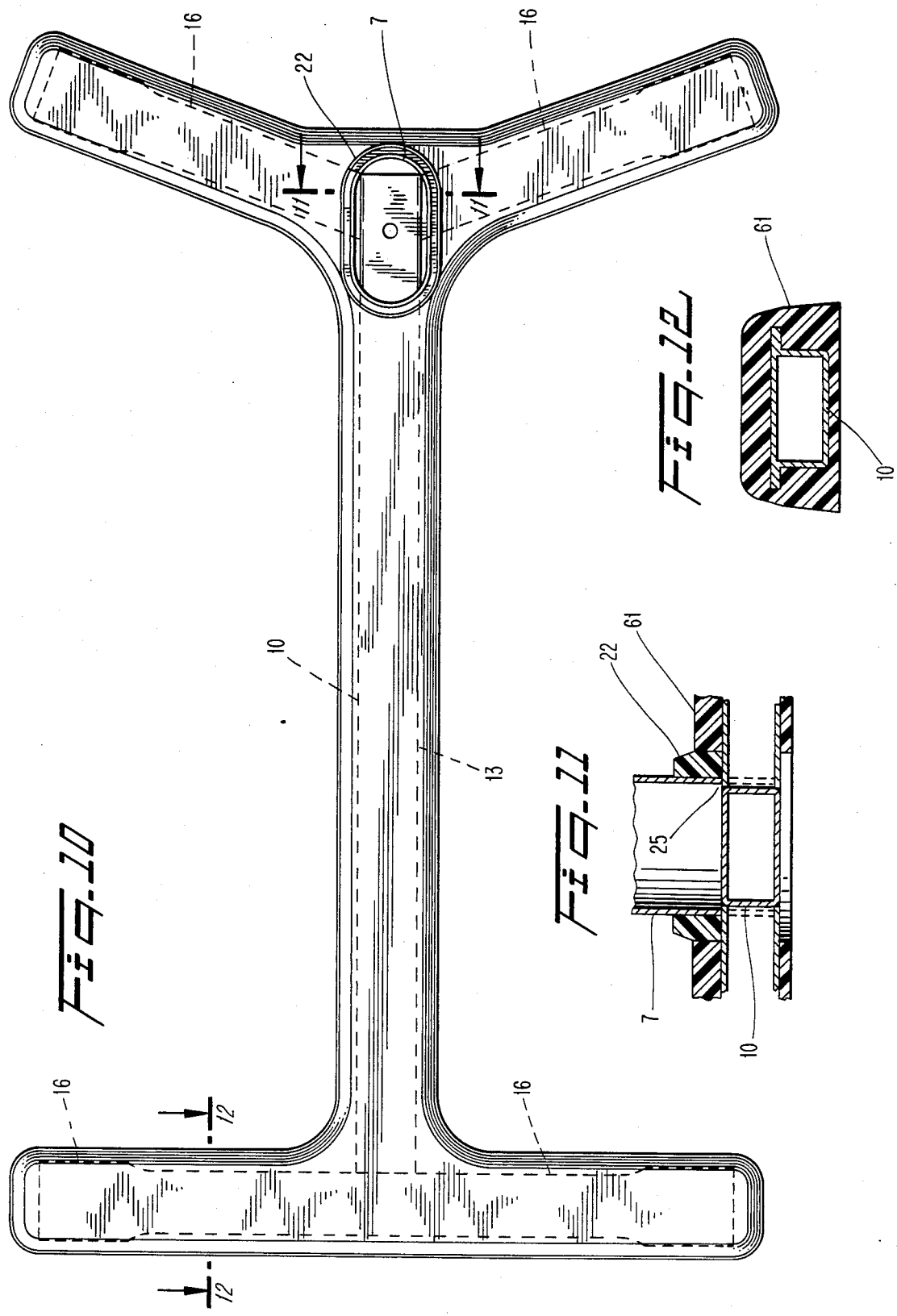

METHOD FOR THE PRODUCTION OF PEDESTAL STRUCTURES

BACKGROUND OF THE INVENTION

The present invention is directed to a method for the production of a pedestal assembly which includes a molded collar portion.

Accessory furniture which may be employed in, for example, the health care industry, is well known. Such furniture includes a pedestal assembly which supports a functional component such as a table, tray, storage unit, etc. Such pedestal assemblies have also been used in chairs and related furniture. It is often desirable for the base portion of such a pedestal assembly to have a protective or ornamental coating. Polyurethane coatings have been employed to provide such protection as well as to enhance the aesthetic aspects of the pedestal assembly.

Such coatings have been provided by means of injection molding wherein the base portion of the pedestal assembly is coated with an injected molding material (e.g., polyurethane) under elevated temperature and pressure. However, such injection molding operations, while successful, have not always been conducted with efficiency when the pedestal assembly to be coated with the molding material is three-dimensional in configuration (i.e., when the pedestal assembly comprises a horizontally-oriented base member and a vertically-oriented supporting structure). In such an instance, a portion of the assembly such as the vertically-oriented supporting structure will normally extend from the injection mold and means must be provided to prevent the injected molding material from exiting from the mold via the annular space between the mold and the surface of the supporting structure.

While various means have been employed to seal the annular space between the supporting structure which extends from the mold and the interior of the mold, such means (e.g., slides, seals, etc.) often result in the formation of an uneven and unattractive edge or parting line which results in an unacceptable appearance. The use of such means also necessitates additional effort during the molding operation.

It would thus be desirable to provide an improved method for the production of a pedestal assembly which method enables the base portion of the pedestal assembly to be provided with a coating by means of injection molding which coating exhibits an acceptable appearance and which method enables enhanced efficiency to be obtained.

OBJECTS AND SUMMARY OF THE INVENTION

It is accordingly an object of the present invention to provide an improved method for the production of a pedestal assembly by means of injection molding.

It is also an object of the present invention to provide a method for the production of a coated pedestal assembly by means of injection molding which includes a molded collar portion.

It is also an object of the present invention to provide a method for the production of a coated pedestal assembly by means of injection molding which avoids the disadvantages of the prior art as discussed above.

In accordance with the present invention, there is thus provided a method for the production of a pedestal assembly which includes a molded collar portion comprising the steps of:

(a) providing a pedestal assembly having multiple elongated component members joined together and oriented at an angle to one another, one of said multiple component members comprising a vertically oriented first component supporting member and another of said multiple component members comprising at least one horizontally oriented second component base member, said pedestal assembly further including a precast collar having an aperture in an upper extent thereof through which said first component supporting member extends, the inner dimension and shape of said collar aperture being substantially identical to the outer dimension and cross-sectional configuration of the portion of said first component member extending through and positioned adjacent said precast collar, and a lower extent of said collar being positioned in encompassing relationship to the junction between said first component member and said at least one second component member;

(b) positioning said pedestal assembly within a mold of such configuration and in such a manner whereby said at least one second component base member is positioned within said mold and a portion of said first component supporting member extends from said mold through a mold aperture while urging the upper extent of said precast collar into cooperative engagement with both a portion of said mold adjacent said mold aperture and the portion of said first component supporting member extending through and adjacent said mold aperture to effect an annular seal around said portion of said first component supporting member, thus preventing molding material injected into said mold during the molding process from exiting from said mold through said mold aperture while permitting said injected material to surround at least a portion of said at least one second component base member and at least a portion of the lower extent of said precast collar during the molding process;

(c) introducing molding material into the interior of the mold under molding conditions to coat at least a portion of said at least one second component base member and at least a portion of the lower extent of said collar;

(d) permitting said injected molding material to cure; and (e) subsequently removing said coated pedestal assembly from said mold.

BRIEF DESCRIPTION OF THE DRAWINGS

FIG. 1 is a perspective view of a pedestal assembly of the present invention in use.

FIGS. 2 and 3 are top and bottom perspective views, respectively, of a collar employed in the method of the present invention.

FIG. 4 is a side elevation of a collar employed in the method of the present invention.

FIG. 5 is a plan view of the bottom half of an injection mold employed in the method of the present invention.

FIG. 6 is a sectional view of the injection mold of FIG. 5 along the line 6—6.

FIG. 7 is a perspective view of the pedestal assembly prior to injection molding with an attached collar.

FIG. 8 is a sectional view of the mold with the pedestal assembly in place prior to injection molding.

FIG. 9 is a perspective view of a pedestal assembly subsequent to injection molding.

FIG. 10 is a plan view of a pedestal assembly subsequent to injection molding.

FIGS. 11 and 12 are sectional views of the pedestal assembly of FIG. 10 along the lines 11—11, 12—12, respectively.

DETAILED DESCRIPTION OF THE INVENTION

The method of the present invention may be employed with advantage in the production of pedestal structures or assemblies which comprise one component of accessory furniture such as that employed in the health care industry. Such accessory furniture includes storage units, chairs, I.V. units, tables and tray units or any other type of furniture or accessory thereof which includes single or multiple pedestal assemblies having a horizontally-positioned base member and a vertically-oriented member which serves to support the functional portion of the unit.

One such accessory unit is depicted in FIG. 1 and comprises a combination table-storage unit 1. The table-storage functional portion 4 is attached to and supported by an elongated vertically-oriented supporting structure 7 (first component member) which is itself attached to an elongated horizontally-oriented base 10 (second component member).

The horizontally-oriented base 10 is generally comprised of a centrally disposed longitudinal member 13 of elongated length and laterally disposed members 16 positioned at the ends of the longitudinal member to provide lateral and longitudinal stability. The base 10 may advantageously include means 19 (e.g., casters, wheels) attached at the ends of the laterally disposed members 16 to facilitate the movement of the accessory unit 1 from one location to another.

The horizontally-oriented base 10 is advantageously provided with a coating on the exterior surface thereof to enhance the durability and the aesthetics of the unit as well as to provide protection against inadvertent forceful contact with the base member. As depicted in FIG. 1, a collar 22 extends upwardly a short distance from the upper surface of the base 10 along the external surface of the vertically-oriented supporting structure 7 in a manner consistent with the present invention. The use of such a collar in the molding method of the present invention enables a pedestal assembly as depicted to be produced with ease and efficiency.

The collar 22 which is employed in the method of the present invention is depicted in FIGS. 2, 3 and 4. The collar 22 comprises a precast molded member comprised of a resilient molding material (preferably a thermoplastic material) which is compatible with the molding material used to coat the base of the pedestal assembly both from the standpoint of aesthetics as well as from the standpoint of adherence between the respective molding materials. The molding material employed to produce the precast collar and the molding material used to coat the pedestal assembly are preferably the same. For example, the precast collar is preferably comprised of polyurethane to enable the collar to be resiliently compressed during the molding step as discussed below.

The precast collar is configured such that it may be be slipped in an encompassing relationship to both the vertically-oriented supporting member 7 and the horizontally-oriented base member 10. The precast collar is configured such that it can be positioned in encompassing relationship to the junction 25 (FIGS. 1, 7 and 11) between the vertically-oriented supporting member 7 and the base member 10. Such encompassing relationship is effected by means of the U-shaped portions 28 in the sides of the lower extent of the collar which enable the collar to slip over the top and lateral portions of the horizontally-oriented base member which are adjacent to the joint between the supporting member 7 and the base member 10.

Such encompassing relationship is further effected by means of an aperture 31 in an upper extent of the collar. The inner dimension and shape of the collar aperture are substantially identical to the outer dimension and cross-sectional configuration of the portion of the first component member positioned adjacent to the collar to enable an effective seal to be formed between the collar and the external surface of the first component member.

The vertically and horizontally-oriented portions of the pedestal assembly generally comprise separate metallic elements which are joined together by suitable means such as by welding and which possess sufficient strength and dimension to serve as a supporting structure for an attached functional unit (e.g., a tray unit). Such members may be either tubular in configuration in order to minimize the weight of the pedestal assembly or, in the alternative, solid or weighted to provide greater stability if necessary.

The method of the present invention is undertaken by means of injection molding. A suitable injection mold for use in the present invention is depicted in FIGS. 5 and 6. The mold interior 34 in first mold half 55 conforms to the configuration of a horizontally-oriented base member, while also including a mold aperture 37 through which the vertically-oriented supporting member extends upon the placement of the assembly in the mold prior to the injection molding step. The assembly will generally be positioned in the mold in a manner such that the vertically-oriented member will extend downwardly as opposed to extending upwardly to facilitate the placement of the assembly in the mold. When in use, a second mold half (not shown) is placed upon the first mold half in sealing relationship thereto, with a suitable molding material being inserted into the mold cavity 34 via the second mold half (also not shown). Such injection means suitably comprises a mix head into which the respective components of the molding material are injected.

Advantageously, the mold includes means to form the precast collar simultaneously with the formation of the coated pedestal assembly. Such means as depicted in FIGS. 5 and 6 comprise mold cavities 38 into which molding material may be injected at the same time as such material is injected into mold cavity 34. The second mold half will accordingly include corresponding cooperative mold surfaces (not shown) which are positioned within the mold cavities 38 to enable the desired precast collar member to be formed. Heat exchange tubes 39 are provided in the respective mold halves to enable the temperature of the mold to be adjusted via the passage of a heat exchange fluid (e.g., water) through the tubes in a conventional manner.

Prior to placement of the assembly in the mold, the precast collar 22 is positioned in an encompassing relationship to the joint between the horizontally and vertically-oriented components of the assembly as depicted in FIG. 7. The internal dimension and configuration of the collar is such that a friction fit preferably results upon the placement of the collar around the vertically-oriented member 7 which more effectively enables a seal to be provided between the collar and the external surface of the vertically-oriented member during the molding step.

The mold aperture 37 through which the vertically-oriented member extends includes a portion which is configured to receive in mating relationship the collar which has been placed on the base member (FIG. 8). The aperture is of a dimension in excess of the dimension of the vertically-oriented member 7.

As depicted in FIG. 8, shoulder means are provided in the first mold half 55 adjacent the aperture 37 against which the collar 22 is seated during the molding process. Upon the closure of the mold prior to the molding step, the collar 22 (preferably comprised of a resilient material) is caused to be urged against the shoulder means to ensure that an effective seal is formed between the interior of the mold and the aperture 37 through which the vertically-oriented member 7 extends (FIG. 8).

The shoulder preferably includes both a first abutting surface 40 disposed substantially perpendicular to the longitudinal axis of the adjacent vertically-oriented member 7 and a second abutting surface 43 adjacent to and intersecting said first abutting surface 40 which is oblique to the longitudinal axis of said vertically-oriented member. The precast collar correspondingly will include surfaces 46, 49 which serve to cooperatively engage abutting surfaces 40 and 43 upon the urging of the collar against such surfaces upon closure of the mold.

The collar also is configured so as to extend above and from the internal surface of the first mold half prior to engaging the horizontally-oriented member in the mold. That is, external surface 50 extends from oblique surface 49 to the horizontally-oriented member. Thus, the horizontally-oriented member 10 is caused to be spaced from the internal surface of the first mold half 55 by a distance equal to the length of surface 50 of the collar. The thickness of the applied coating will thus correspond to the distance the collar extends from the internal surface of the first mold half.

It should be apparent that the collar configuration depicted in the Figures may be modified without disadvantage. For example, the oblique surface 49 may be deleted resulting in a collar of substantially rectangular cross-section. The only factor to be necessarily considered is the extension of the collar above the internal surface of the first mold half 55 and the urging of the collar against an abutting surface of the first mold half to seal the mold aperture 37. However, it is preferred for the upper extent of the collar to include the noted oblique surface from the standpoint of aesthetics.

Desirably, spacing means 52 is provided in the mold against which the base portion of the assembly is seated upon closure of the mold and during the molding step. Such a member enables the horizontally-oriented member 10 to be spaced outwardly from the interior surfaces of the mold so that all exterior surfaces of the horizontally-oriented members may be coated with the molding material upon injection of same into the mold cavity.

Such means is preferably comprised of a resilient material in the form of a relatively thin sheet which is seated within the interior surface of the second mold half 58. While preferably resilient, the spacing means should retain sufficient inelasticity to satisfactorily serve to separate the horizontally-oriented member 10 from the second mold half 58 upon closure of the mold and compression of the spacing means. Such spacing means also serves to seal the end of the vertically-oriented member 7 (if open) within the mold.

Upon closure of the mold by placement of the opposing mold halves 55, 58 together, the molding step may be conducted in a conventional manner using conditions of temperature and pressure and molding materials known to those skilled in the art.

For example, a variety of thermoplastic resins may be employed in the method of the present invention and one skilled in the art can readily determine the suitability of a resin based upon the intended use and characteristics desired. Polyurethane resins have been found to have particular applicability to the claimed method and are accordingly preferred.

Exemplary polyurethane resin components (i.e., polyol and isocyanate components) are available from Freeman Chemical Co. under the tradenames Chempol 2332 (polyol) and Chempol 2051 (aromatic diisocyanate) and from the Colorim division of Recticel Foam Co. under the tradenames Polyfast 21084 (polyol) and Isofast 160T (aliphatic diisocyanate).

It is desirable for the resin to be pigmented to enhance the aesthetics of the pedestal assembly. Exemplary pigments which have been found to be suitable include those available from Freeman Chemical Co. under the designation X21904-4-PDI and from Colorim under the designation Colorpaste 20018R.

The molding conditions which have been employed with success include mold temperatures of from about 140°–145° F., curing times of about 3.5 minutes, total shots of about 1600 grams at about 380 grams/sec, resin component temperatures of about 70° F., with injection rates of polyol of about 200 grams/sec and of isocyanate of about 175 grams/sec at injection pressures of about 120–150 psi.

Upon completion of the molding step and the curing cycle, the respective mold halves are separated from one another and the coated pedestal assembly removed from the mold. The pedestal assembly will accordingly comprise the respective vertically and horizontally-oriented members 7, 10 the junction of which is encompassed by both the precast collar and the coating formed during the injection molding step.

FIG. 9 depicts a view in perspective of the joint between such members 7, 10 together with the encompassing precast collar 22 (partially covered by the injected molded coating) and the injected molded coating 61.

FIG. 10 is a plan view of the upper surface of the coated pedestal assembly subsequent to the molding step and depicts the precast collar 22, the coated horizontally-oriented member 10 and the vertically-oriented member 7. Laterally-disposed members 16 and centrally-disposed longitudinal member 13 are also depicted.

FIGS. 11 and 12 depict in cross-section the vertically and/or horizontally-oriented members 7, 10 together with the precast collar 22 and the applied coating 61. Once the injection molding step is completed, the precast collar and the applied coating comprise a substantially unitary structure, with the pedestal assembly being suitable for use in the form as removed from the mold without the need for significant trimming of same except around the periphery adjacent to the line of intersection of the two mold halves.

The detailed description set forth is the preferred embodiment of the method of the present invention. However, certain changes may be made in carrying out the above method without departing from the scope of the invention. It is therefore intended that all matter contained in the above description shall be interpreted as illustrative and not in a limited sense. It is also to be understood that the following claims are intended to cover all of the generic and specific features of the invention herein described, and all statements of the scope of the invention, which as a matter of language, might be said to fall therebetween.

I claim:

1. A method for the production of a pedestal assembly which includes a molded collar portion comprising the steps of:

(a) providing a pedestal assembly having multiple elongated component members joined together at a joint and oriented at an angle to one another, one of said multiple component members comprising in normal use orientation a vertically oriented first component supporting member and another of said multiple component members comprising in normal use orientation at least one horizontally oriented second component base member, said pedestal assembly further including a precast collar having an aperture in an upper extent thereof through which said first component supporting member extends, the inner dimension and shape of said collar aperture being substantially identical to the outer dimension and cross-sectional configuration of the portion of said first component member extending through and positioned adjacent said precast collar, and a lower extent of said collar being open ended and so configured to permit said collar to be positioned in encompassing relationship to the joint between said first component member and said at least one second component member;

(b) positioning said pedestal assembly within a mold of such configuration and in such a manner whereby at least a portion of said at least one second component base member and said joint are positioned within said mold and said portion of said first component supporting member extending through said precast collar extends from said cold through a mold aperture;

(c) urging the upper extent of said precast collar into cooperative engagement with both a shoulder portion of said mold adjacent said mold aperture and the portion of said first component supporting member extending through said mold aperture and adjacent said shoulder portion to effect an annular seal around said portion of said first component supporting member, said precast collar also causing said second component base member to be spaced from the portion of said mold adjacent said mold aperture, said collar thus preventing molding material injected into said mold during the molding process from exiting from said mold through said mold aperture while permitting said injected material during the molding process to surround at least a portion of the external surface of said at least one second component base member within said mold and at least a portion of the lower extent of said precast collar;

(d) introducing molding material into the interior of the mold under molding conditions sufficient to coat at least a portion of the external surface of said at least one second component base member within said mold and at least a portion of the lower extent of said collar;

(e) permitting said injected molding material to cure; and (f) subsequently removing said coated pedestal assembly from said mold.

2. The method of claim 1 wherein said mold comprises opposing first and second mold halves, said first component member extending from said mold through an aperture in said first mold half, with a shoulder portion of said first mold half being urged against said upper extent of said precast collar to effect an annular seal between an external surface of said first component member and said first mold half and preventing molding material from exiting from said mold adjacent said first component member through said mold aperture.

3. The method of claim 2 wherein said portion of said first mold half which is urged against said upper extent of said precast collar includes at least one abutting surface which is configured to cooperatively engage said precast collar to effect said annular seal.

4. The method of claim 3 wherein said portion of the first mold half which cooperatively engages said upper extent of said collar when urged against said collar includes a first abutting surface which is generally perpendicular to the longitudinal axis of said first component member and adjacent said first component member and a second abutting surface which intersects said first abutting surface and which is oblique to the longitudinal axis of said first component member.

5. The method of claim 1 wherein said precast collar is comprised of a resilient material which is at least partially compressed by the urging of said mold against said precast collar.

6. The method of claim 2 wherein said at least one second component base member is spaced from said first and second mold halves within said mold.

7. The method of claim 6 wherein spacing means is positioned between said at least one second component member and said second mold half to permit molding material to substantially encompass said at least one second component base member within said mold.

8. The method of claim 1 wherein said precast collar extends over lateral portions of said at least one second component base member in a semi-encompassing relationship.

9. The method of claim 1 wherein said at least one second component base member comprises laterally extending members which are joined together and which extend along the same plane.

10. The method of claim 9 wherein said precast collar extends over lateral portions of each of said laterally extending members in an encompassing relationship to the joint between said laterally extending members.

* * * * *